United States Patent [19]

Green

[11] Patent Number: 4,541,256

[45] Date of Patent: Sep. 17, 1985

[54] FLANGE LOCK

[76] Inventor: John Green, 204 S. Trail Ridge Rd., Edmond, Okla. 73034

[21] Appl. No.: 462,459

[22] Filed: Jan. 31, 1983

[51] Int. Cl.$^4$ ............................................... F16B 41/00
[52] U.S. Cl. ........................................ 70/232; 70/371; 70/417; 285/45; 285/80; 16/386
[58] Field of Search ................. 70/229, 230, 423, 232, 70/177, 178, 163, 371, 417, 57, 58; 285/45, 80; 166/92, 93; 16/271, 272, 380, 386, 254, 260, 231; 292/307 B, 307 R; 220/337, 340; 411/366, 378, 427

[56] References Cited

U.S. PATENT DOCUMENTS

| | | | |
|---|---|---|---|
| 725,290 | 4/1903 | Speer | 70/232 |
| 795,952 | 8/1905 | Angeloni et al. | 70/232 |
| 994,409 | 6/1911 | Kelly | 70/178 |
| 1,213,599 | 1/1917 | Dow | 411/427 X |
| 1,257,322 | 2/1918 | Cunningham | 70/177 X |
| 1,892,192 | 12/1932 | Smith | 70/232 |
| 2,565,659 | 8/1951 | Kontra | 70/232 |
| 3,130,571 | 4/1964 | Neumann | 70/58 |
| 3,236,408 | 2/1966 | McFadden et al. | 220/337 |
| 3,245,240 | 4/1966 | DeForrest | 70/232 X |
| 3,391,555 | 7/1968 | Mamo | 70/258 |
| 3,526,110 | 9/1970 | Foote | 70/258 |
| 3,600,912 | 8/1971 | Foreman | 70/77 |
| 3,711,894 | 1/1973 | Walters | 70/371 X |
| 3,766,759 | 10/1973 | Artner | 70/58 |
| 3,768,189 | 10/1973 | Goodrich | 70/57 X |
| 4,007,613 | 2/1977 | Gassaway | 70/58 |
| 4,144,729 | 3/1979 | Nielsen, Jr. | 70/232 X |
| 4,282,983 | 8/1981 | Swartzbaugh | 220/337 X |
| 4,300,373 | 11/1981 | Camos et al. | 70/232 |

FOREIGN PATENT DOCUMENTS 478454  1/1938  United Kingdom ................ 220/337

Primary Examiner—Gary L. Smith
Assistant Examiner—Thomas J. Dubnicka

[57] ABSTRACT

A flange lock for preventing unauthorized access to flanged connections, comprises a pair of semi-cylindrical shells having face plates at at least one end thereof. The shells are hingedly interconnected by a tongue on one that passes through a slot in the other. At their free ends, the shells carrying three sleeves that align with each other in the closed position of the device, two sleeves on one shell and a third sleeve that fits between the first two, on the other shell. A screw-threaded nipple passes through two of the aligned sleeves in the closed position and is screwed into the end sleeve; and a screw type cam lock has a rod that passes through the nipple and screws into a plug carried by the end sleeve. The cam lock is non-rotatable relative to the nipple but its rod can be rotated to screw into and unscrew from the plug, thereby respectively to lock and release the assembly, when a key is inserted in the cam lock. The sleeves are carried by outwardly inclined plates thereby to increase the available space within the shells.

9 Claims, 5 Drawing Figures

FLANGE LOCK

The present invention relates to flange locks, more particularly of the type to prevent unauthorized access to a flange by persons who would unfasten the same to steal what is secured by the flange.

The well heads in oil fields consist of complicated and expensive arrangements of valves sometimes called "Christmas trees", secured simply by flanges through which bolts pass. Generally speaking, such flanged detachable assemblies are of two types: single flanged assemblies, in which a member such as a valve is provided with bolts secured thereto that pass through a single flange of a conduit to which the valve is to be attached, and double flanged assemblies, which when superposed receive separable bolts therethrough to interconnect two adjacent conduit ends. The present invention is useful to protect each type of flange assembly.

Accordingly, it is an object of the present invention to provide a flange lock which will securely prevent unauthorized access to any of a variety of flange assemblies.

Another object of the present invention is to provide such a flange lock, which will be easy and inexpensive to manufacture, quick and simple to emplace and remove, and rugged and durable in use.

Other objects, features and advantages of the present invention will become apparent from a consideration of the following description, taken in connection with the accompanying drawings, in which.

Figure 1:
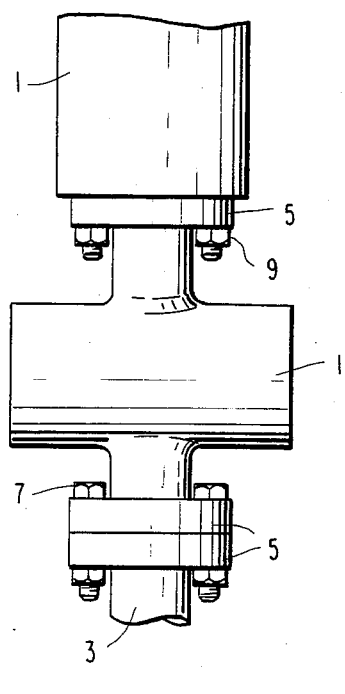
FIG. 1 is a fragmentary elevational view, somewhat schematic in nature, showing a portion of a well head in an oil field, embodying two of the flange types the present invention is adapted to protect.

Referring now to the drawings in greater detail, and first to FIG. 1, there is shown in greatly simplified form a portion of a conventional well head adapted to be protected by the present invention, comprising a plurality of valve housings 1, and the conduits 3 which interconnect them. The joints between housings 1 and conduits 3 are provided by annular flanges 5 which can be either on the casings themselves or on the conduits and can be single flanges as shown at the top of FIG. 1 or double flanges as shown at the bottom of FIG. 1. Bolts 7 pass through flanges 5 and are releasably secured in assembled relation by nuts 9, all as is conventional.

Figure 2:
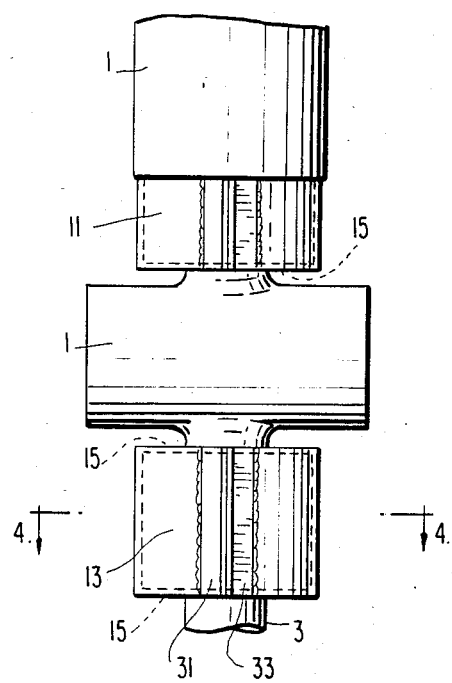
FIG. 2 is a view similar to FIG. 1, but showing the flange locks of the present invention in place thereon.

FIG. 2 shows the present invention protecting the flanges of FIG. 1. Two embodiments of flange locks 11 and 13 are shown, which differ principally in that lock 11 is characterized by only a single face plate 15; whilst lock 13 is characterized by double face plates 15.

Figures 3, 4:
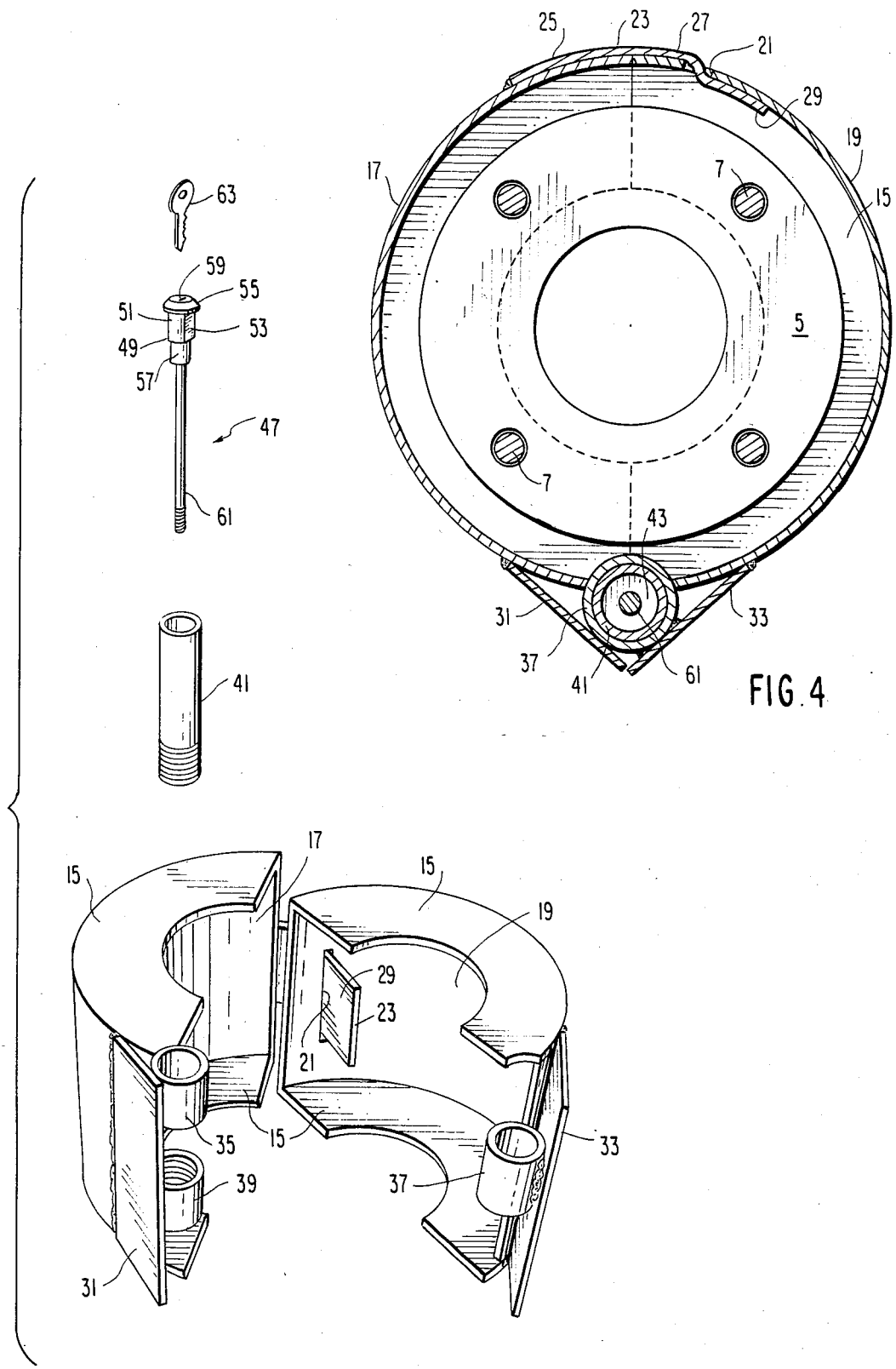
FIG. 3 is an exploded perspective view of a flange lock according to the invention.
FIG. 4 is an enlarged cross-sectional view taken on the line 4—4 of FIG. 2.

Turning now to FIG. 3, the shapes of those face plates 15 can be seen to be semi-annular. Face plates 15 are interconnected by semi-cylindrical shells 17 and 19. Shell 19 has a vertical slot 21 through a rear portion thereof spaced from its adjacent rear edge, to receive a tongue 23 which is secured to the other shell 17.

Turning now to FIG. 4, we see the tongue-and-slot interconnection between shells 17 and 19 in greater detail. As is evident from FIG. 4, a base portion 25 of tongue 23 is secured as by welding to the rear surface of shell 17. An intermediate portion 27 of tongue 23 extends edgewise beyond shell 17 and overlies the rear portion of shell 19 between slot 21 and the adjacent rear edge of shell 19. A free end portion 29 of tongue 23 is interconnected with portion 27 by a reverse bend, the reverse bend extending through slot 21, whereby portion 29 underlies and fits snugly against the inside of shell 19 on the forward side of slot 21 in the closed position shown in FIG. 4.

The slot 21 and tongue 23 thus provide a simple but rugged hinge connection between the casing halves 17 and 19, enabling them to swing between the open position shown in FIG. 3, and the closed position shown in FIG. 4. As the parts are constructed of heavy sheet steel, it will be appreciated that the hinge is not only simple and inexpensive, but also completely secure against tampering.

Returning now to FIG. 3, we see at the forward or opening edges of shells 17 and 19, two plates 31 and 33 which are relatively narrow upright flat plates welded at their rear edges to shells 17 and 19, respectively, and inclining forwardly away from their respective shells. Plate 31 carries vertically spaced and aligned securing sleeves 35 and 39 welded to its inner side; while plate 33 carries securing sleeve 37 welded to its inner side. The vertical distance between sleeves 35 and 39 is sufficient to receive sleeve 37 in vertical alignment therewith when the lock is closed.

The purpose of plates 31 and 33 is to space the sleeves 35–39 sufficiently far outwardly to enable flanges of relatively large diameter to be protected without otherwise enlarging the flange lock.

Figure 5:
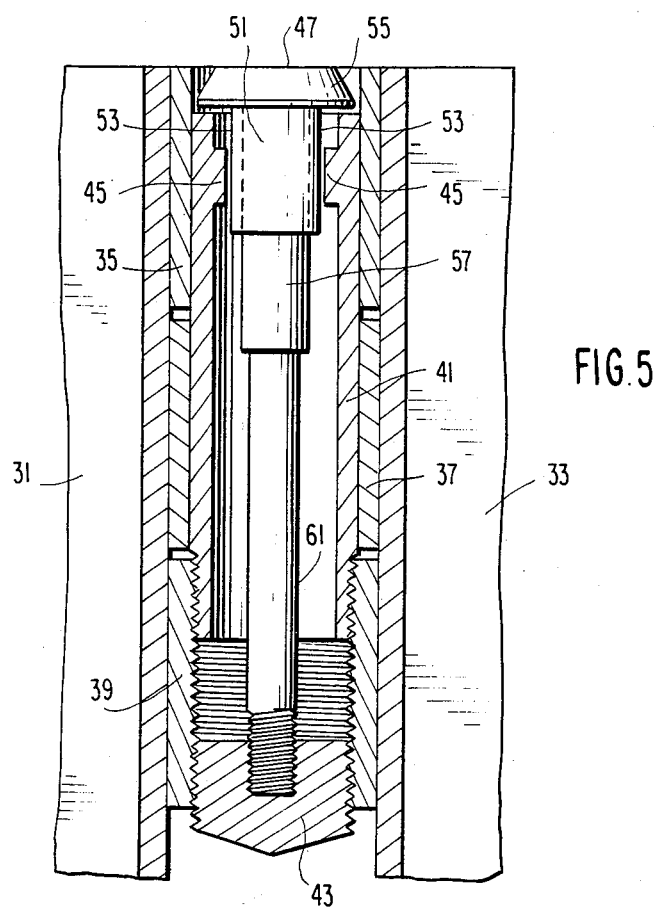
FIG. 5 is an enlarged cross-sectional view of the locking mechanism.

Notice that sleeve 39 is internally screw-threaded but sleeves 35 and 37 are not. As best seen in FIGS. 3 and 5, a securing nipple which is a vertical hollow cylinder screw-threaded at its lower end, is screw-threadedly received in sleeve 39 and slidably received in sleeves 35 and 37. An externally screw-threaded plug 43, which is internally tapped and screw-threaded, is in screw-threaded engagement in the lower end of sleeve 39, as seen in FIG. 5. The upper end of nipple 41 has two diametrically opposed projections 45 on its inner surface, for a purpose to be explained hereinafter.

A screw type cam lock 47, of entirely conventional construction, releasably holds the parts in assembled relationship against unauthorized opening. Locks such as lock 47 are a standard item of hardware whose construction as such forms no part of this invention. Suffice it to say that lock 47 comprises a body 49 having a pair of diametrically opposed part cylindrical surfaces 51 of which only one is shown in FIG. 3, alternating with vertical flats 53 of which again only one is shown in FIG. 3. Body 49 has a horizontal flange 55 at its upper end; and the upper end of a shank 57 that passes through body 49 is exposed at the upper end of body 49 and projects downwardly below body 49. The upper end of shank 57 has a keyhole 59 therein. A rod 61 is secured to the lower end of shank 57 and is screw-threaded at its lower end for screw-threaded engagement in the internal tapped hole in plug 43, as shown in FIG. 5. A key 63 is insertable in keyhole 59. As is characteristic of these conventional screw type cam locks, shank 57 can be turned within body 49 only when an appropriate key 63 is inserted in keyhole 59.

Turning now to FIG. 5, the relationship of the parts when the lock is applied will be apparent. Lock 47 is disposed within nipple 41 with its flange 55 covering the upper edge of nipple 41. Projections 45 are disposed one opposite each flat 53, so that body 47 cannot turn within nipple 41 but can only slide axially thereof. The lower end of rod 61 is screwed into plug 43. The lower end of nipple 41 is screwed into sleeve 39; and sleeves 35 and 37 both surround nipple 41.

To apply the lock of the present invention, the lock in its open position in FIG. 3 is placed about the flange assembly to be protected. If a double flange is to be protected, as at the bottom of FIG. 1, then the flange lock 13 is used as shown in FIG. 3; but if only a single flange is to be protected as at the top of FIG. 1, then a flange lock 11 is used with but a single face plate 15.

Assuming a double flange is to be protected and the flange lock 13 is to be used, the device as shown in FIG. 3 is then closed about the double flange to the position of FIGS. 2 and 4, in which the sleeves 35, 37 and 39 are vertically axially aligned. The nipple 41 is then slid down through the assembly of sleeves 35 and 37 and screwed into the upper end of sleeve 39. Lock 47 is then slid down into nipple 41, with the projections 45 confronting flats 53, so that the flats 53 can pass between projections 45. The greatest diameter of part cylindrical surfaces 51 on body 49 is such that these surfaces can never confront projections 45: in other words, there is only one orientation in which the lock 47 can be inserted, and that is as shown in FIG. 5.

At this point, the lower end of rod 61 rests on plug 43 but cannot be screwed into plug 43 because rod 61 cannot turn relative to shank 57 and shank 57 cannot turn relative to body 49 of lock 47 and body 49 cannot turn in nipple 41. The key 63 is then inserted in keyhole 59 and this permits turning shank 57 and hence rod 61 within body 49, thereby to screw the lower end of rod 61 into plug 43. As very little torque is needed for this, the key 63 itself can be used as the tool to turn shank 57. Lock 47 thus settles within its seat until the upper surface of flange 55 is about flush with the upper end of sleeve 35.

When key 63 is removed, there can be no relative movement of the parts; and no tampering or other effort at unauthorized entry can succeed.

To remove the lock, the reverse procedure is of course followed: key 63 is inserted in keyhole 59 and rod 61 is unscrewed from plug 43, after which lock 47 can be removed; nipple 41 can be unscrewed from sleeve 39 and removed from within the sleeves 35 and 37; and the lock halves can be swung to the open position shown in FIG. 3 and removed to expose the previously protected flange assembly.

From a consideration of the foregoing disclosure, therefore, it will be evident that the initially recited objects of the present invention have been achieved.

Although the present invention has been described and illustrated in connection with preferred embodiments, it is to be understood that modifications and variations may be resorted to without departing from the spirit of the invention, as those skilled in this art will readily understand. Such modifications and variations are considered to be within the purview and scope of the present invention as defined by the appended claims.

What is claimed is:

1. A flange lock comprising a pair of shells, hinge means swingably interconnecting the shells at one end thereof, and lock means releasably interconnecting the shells at the other end of the shells, each of said shells having at least one inwardly extending face plate thereon and being of a shape to encompass at least one flange to be protected when swung together and locked, said other ends of said shells having sleeves secured thereto which align with each other in the closed position of the flange lock, a hollow nipple disposed within and extending between said sleeves, and lock means extending through said hollow nipple releasably to retain said nipple in said sleeves against unauthorized removal, said lock means comprising a screw type cam lock operated by a key, said cam lock being releasably received within said nipple, said cam lock and said nipple having coacting non-circular portions to prevent rotation of a portion of said cam lock within said nipple, said cam lock having a rod having screw-threaded engagement with means carried by a said shell, said rod being rotatable relative to said nipple only when said key is inserted in said cam lock thereby to permit engaging and disengaging said rod from said screw-threaded means.

2. A flange lock as claimed in claim 1, there being three said sleeves two of which are spaced apart and aligned with each other on one said shell and the third of which is on the other said shell and is adapted to fit between and in alignment with said two sleeves in the closed position of the flange lock.

3. A flange lock as claimed in claim 1, only one of said sleeves being internally screw-threaded and one end of said nipple being externally screw-threaded to enter into screw-threaded engagement with said internally screw-threaded sleeve.

4. A flange lock as claimed in claim 1, said screw-threaded means comprising an end portion of one of said sleeves.

5. A flange lock as claimed in claim 4, said end portion comprising an externally screw-threaded plug disposed in an internally screw-threaded portion of one of said sleeves.

6. A flange lock as claimed in claim 1, said cam lock having a flange at the same end thereof through which said key is inserted, said flange overlying said nipple.

7. A flange lock as claimed in claim 6, one of said sleeves surrounding said flange on said cam lock.

8. A flange lock comprising a pair of shells, hinge means swingably interconnecting the shells at one end thereof, and lock means releasably interconnecting the shells at the other end of the shells, each of said shells having at least one inwardly extending face plate thereon and being of a shape to encompass at least one flange to be protected when swung together and locked, said other ends of said shells having sleeves secured thereto which align with each other in the closed position of the flange lock, a hollow nipple disposed within and extending between said sleeves, and lock means extending through said hollow nipple releasably to retain said nipple in said sleeves against unauthorized removal, said shells being semi-cylindrical and terminating at their free ends in plates that are outwardly inclined, said sleeves being secured to the inner sides of said plates whereby at least a portion of said sleeves lies outside the semi-cylindrical contour of the shell.

9. A flange lock as claimed in claim 8, two said sleeves being welded in spaced apart aligned relation to the inner side of one said plate and a third said sleeve being welded to the inner side of the other said plate to fit between said two sleeves in the closed position of the flange lock, one of said two sleeves being internally screw-threaded for screw-threaded engagement with an externally screw-threaded end of said nipple, the other two said sleeves being internally smooth thereby slidably to receive said nipple, and a screw type cam lock having a non-circular body that is non-rotatably receivable in a non-circular internal portion of said nipple at the other end of said nipple, said cam lock having a rod that is rotatable relative to said body only when a key is inserted in said cam lock, said rod being screw-threadedly engageable with internally screw-threaded means carried by said internally screw-threaded sleeve, said cam lock and rod extending through the full length of said nipple.

* * * * *